(12) United States Patent
Busse et al.

(10) Patent No.: US 6,305,522 B2
(45) Date of Patent: Oct. 23, 2001

(54) CLUTCH DISC

(75) Inventors: Jürgen Busse; Hans-Dieter Elison, both of Bühl; Kraft Gunther, Ludwigsburg; Steffen Lehmann, Ettlingen; Andreas Raimann, Inzlingen; Willi Ruder, Lahr; Martin Schindler, Baden Baden, all of (DE); Mario Thümmler, Bangalore (IN); Albert Birk, Bühl (DE)

(73) Assignee: LuK Lamellen Kupplungsbau GmbH, Buhl/Baden (DE)

(*) Notice: Subject to any disclaimer, the term of this patent is extended or adjusted under 35 U.S.C. 154(b) by 0 days.

(21) Appl. No.: 09/746,031

(22) Filed: Dec. 21, 2000

Related U.S. Application Data

(63) Continuation of application No. 09/216,230, filed on Dec. 18, 1998.

(30) Foreign Application Priority Data

Dec. 18, 1997 (DE) .............................................. 197 56 398

(51) Int. Cl.[7] .................................................... F16D 13/68
(52) U.S. Cl. ........................................ 192/107 C; 192/52.6
(58) Field of Search .............................. 192/52.3, 52.6, 192/107 C, 70.14

(56) References Cited

U.S. PATENT DOCUMENTS

| | | |
|---|---|---|
| 2,296,515 | 9/1942 | Goodwin . |
| 2,902,130 | 9/1959 | Halberg et al. . |
| 3,261,439 * | 7/1966 | Binder ................. 192/107 C |
| 3,695,405 * | 10/1972 | Maucher et al. ........... 192/107 C X |
| 3,921,777 * | 11/1975 | Rist ................... 192/107 C |
| 4,422,539 * | 12/1983 | Werner ................ 192/107 C |
| 5,085,307 | 2/1992 | Scheer . |
| 5,452,783 * | 9/1995 | De Briel et al. ........... 192/107 C |
| 5,651,442 * | 7/1997 | Murata et al. ............ 192/107 C X |
| 5,913,398 * | 6/1999 | Murata et al. ........... 192/107 C |

FOREIGN PATENT DOCUMENTS

| | | |
|---|---|---|
| 1 425 186 | 3/1963 | (DE) . |
| 1 920 242 | 4/1969 | (DE) . |
| 2 111 892 | 12/1971 | (DE) . |
| 26 41 379 | 6/1977 | (DE) . |
| 27 20 664 | 11/1977 | (DE) . |
| 30 23 634 | 6/1980 | (DE) . |
| 36 18 878 | 6/1986 | (DE) . |
| 36 19 894 | 6/1986 | (DE) . |
| 39 39 120 | 11/1989 | (DE) . |
| 43 00 665 | 1/1993 | (DE) . |
| 1 962 6688 | 7/1996 | (DE) . |
| 197 12 203 | 3/1997 | (DE) . |
| 2 044 864 * | 10/1980 | (GB) ................ 192/107 C |
| 4-102723 * | 4/1992 | (JP) ................. 192/107 C |

* cited by examiner

Primary Examiner—Rodney H. Bonck
(74) Attorney, Agent, or Firm—Darby & Darby

(57) ABSTRACT

A clutch disc wherein two annular washer-like friction linings flank a two-part resilient cushion which moves the friction linings apart during disengagement of a friction clutch wherein the clutch disc is installed between an engine-driven flywheel and an axially movable pressure plate, and which stores energy during engagement of the clutch. A blocking or movement limiting device, which defines a fulcrum for the friction linings, is provided between the parts of the cushion and/or on the friction linings to prevent an axial movement of the friction linings toward each other beyond a selected minimum distance and to thus compensate for deformation of the flywheel and/or pressure plate as a result of heating attributable to slippage of the pressure plate and flywheel relative to the adjacent friction linings during engagement and disengagement of the clutch.

2 Claims, 7 Drawing Sheets

CLUTCH DISC

CROSS REFERENCE TO RELATED APPLICATIONS

This is a continuation of application Ser. No. 09/216,230, filed Dec. 18, 1998. Each of these prior applications is hereby incorporated herein by reference, in its entirety.

BACKGROUND OF THE INVENTION

The invention relates to clutch discs or clutch plates of the type serving to transmit, or to interrupt the transmission of, torque between driving and driven rotary units, e.g., in friction clutches which are installed in the power trains of motor vehicles to transmit torque between a prime mover and a variable-speed transmission or between a transmission and a unit (such as a differential) which receives torque from the transmission.

A standard clutch plate or clutch disc (hereinafter called clutch disc) comprises a rotary support having a hub which can be non-rotatably mounted on the input shaft of a torque receiving unit (e.g., a transmission), and two annular friction linings which are affixed to the support and can be clamped between two coaxial rotary members (e.g., an axially movable pressure plate and an axially fixed counterpressure plate, such as a flywheel affixed to the output element of the internal combustion engine of a motor vehicle). The clutch can further comprise a so-called resilient cushion which is installed between the friction linings to yield during engagement and to dissipate energy during disengagement of the clutch.

Clutch discs of the above outlined character are disclosed, for example, in published German patent application Serial No. 30 23 634, in German Auslegeschrift No. 26 41 379, in German patent No. 27 20 664, and in U.S. Pat. Nos. 2,296,515 and 5,085,307.

When a friction clutch employing or cooperating with a clutch disc of the above outlined character is being engaged, the pressure plate is moved axially toward the counterpressure plate so that the two plates frictionally engage the adjacent exposed surfaces of the respective friction linings. At the same time, the two friction linings are caused to move axially toward each other and thus compress the resilient cushion between them. This entails a gradual (smooth) engagement of the clutch. During the initial stage of engagement of the clutch, the pressure plate and the counterpressure plate slip relative to the respective friction linings with attendant generation of friction heat, i.e., the temperature of the entire friction clutch rises. A serious drawback of such temperature change is that the conicity of the pressure plate increases or that the originally flat friction surface of the pressure plate assumes a conical shape. In fact, even the counterpressure plate (flywheel) of the clutch disc is likely to assume a conical shape which is undesirable even if it is less pronounced than the aforediscussed heat-induced conicity of the friction surface of the pressure plate.

The development of conicity at the friction surfaces of the pressure plate and counterpressure plate (also called reaction plate) results in the establishment of radially outwardly widening annular gaps between the two plates and the adjacent exposed surfaces of the respective friction linings. Reference may be had to the disclosure of U.S. Pat. No. 2,902,130. The development of such gaps, in turn, results in an unequal distribution of surface pressures upon the friction linings, as seen radially of the clutch disc, namely the surface pressure rises in a direction toward the axis of the clutch disc and decreases radially outwardly. Otherwise stated, the clutch disc exhibits a tendency to shift the effect of surface friction nearer to its axis. The result is a non-uniform wear upon the friction surfaces of the friction linings and a reduction of the maximal torque which can be transmitted by the clutch disc and the friction clutch embodying such clutch disc. The reason is a shift of the average effective friction diameter as a function of the radial distribution of surface pressure.

The only presently known solution of the above outlined problems is a replacement of the friction linings, a replacement of the clutch disc which employs such friction linings, or a replacement of the friction clutch which employs or cooperates with the clutch disc.

OBJECTS OF THE INVENTION

An object of the invention is to provide a clutch disc which is not affected, or which is not unduly affected, by the developing conicity of the pressure plate and/or counterpressure plate as a result of pronounced heating of a friction clutch which employs the clutch disc.

Another object of the invention is to provide a clutch disc which is designed in such a way that it can at least partially compensate for the developing conicity of the pressure plate and/or counterpressure plate as a result of heating during partial engagement or disengagement of the friction clutch.

A further object of the invention is to provide novel and improved friction linings for use in the above outlined clutch disc.

An additional object of the invention is to provide a novel and improved resilient cushion for use between the friction linings of the above outlined clutch disc.

Still another object of the invention is to provide novel and improved combinations of resilient cushion and friction linings for use in the above outlined clutch disc.

A further object of the invention is to provide a friction clutch which embodies the above outlined clutch disc.

An additional object of the invention is to provide a novel and improved method of counteracting the adverse effects of the development of conicity of the pressure plate and/or counterpressure plate as a result of overheating during partial engagement or partial disengagemet (slippage) of the friction clutch, e.g., a friction clutch between the internal combustion engine and the variable speed transmission in the power train of a motor vehicle.

Another object of the invention is to provide a clutch disc which is not affected (or not overly affected) by deformation of a pressure plate and/or counterpressure plate as a result of cooling of the friction clutch.

SUMMARY OF THE INVENTION

One feature of the instant invention resides in the provision of a clutch disc which comprises a support rotatable about a predetermined axis and normally comprising a centrally located hub adapted to be secured to a shaft (such as the input shaft of a variable speed transmission in the power train of a motor vehicle), and two washer-like annular friction linings which are coaxial and rotatable with the support. The friction linings are movable relative to each other in the direction of the axis of the support between first positions at a greater first distance from each other and second positions at a lesser second distance from each other. The clutch disc further comprises a resilient cushion which is disposed between the friction linings and is arranged to bias the friction linings in the direction of the axis of the support toward the first positions and to store energy (or additional energy) during movement of the friction linings toward the second positions, and means for blocking movements of the friction linings toward each other beyond the second positions.

As a rule, the friction linings are disposed between, and are movable from the first toward the second positions, by rotary first and second pressure plates of a friction clutch, such as an axially movable pressure plate and an axially fixed counterpressure plate (e.g., a flywheel secured to the output shaft of an internal combustion engine in the power train of a motor vehicle).

In accordance with a highly advantageous feature of the invention, at least one of the friction linings is tiltable relative to a fulcrum defined by the blocking means and constituting an annular pivot or seat having its center at or close to the axis of the support. Each friction lining has a side confronting the other friction lining, and the blocking means can comprise at least one projection provided at (e.g., forming part of) the side of the at least one friction lining. For example, the blocking means can comprise a first portion provided on one of the friction linings and a second portion provided on the other friction lining; at least one of the first and second portions can form part of the respective friction lining.

The blocking means can be designed in such a way that it comprises an annulus of projections provided at that side of at least one of the friction linings which confronts the other friction lining. At least some projections of the annulus can be arcuate projections.

At least one of the friction linings can consist, either entirely or in part (e.g., substantially entirely) of a friction generating material, such as an organic material, and at least a portion of the blocking means can form part of the at least one friction lining.

At least one of the friction linings can comprise an annular portion of friction generating material, and a reinforcing member which supports the annular portion. The reinforcing member can consist of a suitable metallic sheet material, and at least a portion of the reinforcing member can be embedded in the annular portion of friction generating material. The reinforcing member can be disposed at that side of the annular portion which confronts the other friction lining.

At least a portion of the blocking means can be provided on the annular portion and/or on the reinforcing member of the at least one friction lining.

It is also possible to emboss at least a portion of the blocking means into at least one of the friction linings, e.g., to depress selected portions of the aforementioned reinforcing member toward the other friction lining. The embossed portion can include corrugations provided in the at least one friction lining.

The resilient cushion can comprise a plurality of sections, and at least one of the sections can be provided with windows for portions at least or for the entire blocking means. Such portions of the blocking means extend into the respective windows at least in the second positions of the friction linings. Each portion of the blocking means can be received in the respective window in part or entirely when the two friction linings are caused to assume their second positions, i.e., when the clutch is fully or nearly fully engaged.

The blocking means can form an annulus surrounding the axis of the support and having a radial width which can be between about 5% and 30% of the radial width of the friction linings. In many instances, the radial width of the annulus formed by the blocking means can be between about 5% and 15% of the radial width of the friction linings.

The blocking means can be designed in such a way that it comprises a first portion provided on one of the friction linings and a second portion provided on the other friction lining; the first and second portions of the blocking means abut each other at least in the second positions of the friction linings.

The median diameter of the annular fulcrum defined by the blocking means can have a length which is between about 0.3 and 0.7 times the combined length of the inner and outer diameters of a friction lining. It is normally satisfactory if the median diameter of the annular fulcrum has a length which is between about 0.45 and 0.55 times the combined length of the inner and outer diameters of a friction lining. It has been ascertained that, in many instances, it is particularly advantageous if the median diameter of the annular fulcrum defined by the blocking means has a length which is between about 0.48 and 0.52 times the combined length of the inner and outer diameters of a friction lining.

The blocking means can comprise an annulus of circumferentially spaced-apart discrete blocking elements or portions, and the clutch disc can further comprise a plurality of means for fastening the friction linings to the resilient cushion; each such fastening means can be flanked by two of the discrete blocking elements or portions. For example, the fastening means can comprise rivets, and the friction linings are then provided with openings for portions of such rivets. The centers of the openings can be located on a circle having a diameter which matches or at least approximates the median diameter of the annular fulcrum.

The plurality of means for fastening the friction linings to the resilient cushion can form a single circular array of rivets or the like.

The resilient cushion can comprise an annular array of pairs of overlapping sections; such pairs of overlapping sections have radially outer portions remote from the axis of the support and radially inner portions which are nearer to the axis and are affixed to the support by suitable securing means.

The resilient cushion can be designed in such a way that it comprises first and second halves each adjacent a different one of the two friction linings. The two halves can be spaced apart from each other by a distance in the range of between 0.1 mm and 0.7 mm when the friction linings assume their second positions at the lesser second distance from each other. In many instances it is sufficient to select a range of between about 0.2 and 0.5 mm.

At least a portion of the blocking means can be provided on the resilient cushion; for example, such portion of the blocking means can form part of the resilient cushion. The resilient cushion can comprise projections which constitute or form part of the aforementioned portion of the blocking means.

It is also possible to design the blocking means in such a way that it comprises an annulus of discrete arcuate blocking elements provided on at least one of (a) the friction linings and (b) the resilient cushion; such clutch disc can further comprise a plurality of fasteners which alternate with the discrete blocking elements in a circumferential direction of the annulus.

The resilient cushion can comprise two annuli of sections each adjacent a different one of the two friction linings. Each section has at least two openings, and such clutch disc can further comprise means for fastening the friction linings to the sections of the respective neighboring annuli. The fastening means can comprise for each section a first rivet extending through one of the respective openings and serving to affix one section of one of the two annuli to the adjacent friction lining, and a second rivet extending through the other of the respective openings and serving to affix one section of the other annulus to the adjacent friction lining.

The openings of the sections in one of the two annuli of sections can register with openings of sections forming the other annulus as well as with openings provided in the friction linings; such clutch disc can further comprise means for fastening each section of each of the two annuli to the adjacent friction lining, and the fastening means extend through the registering openings of the sections and of the friction linings.

An additional feature of the invention resides in the provision of a friction clutch which comprises first and second annular friction linings and a resilient cushion between the friction linings. The cushion includes a first annular array of sections adjacent the first friction lining and a second annular array of sections adjacent the second friction lining. Each of the two arrays of sections has first and second openings and each opening of a section of the first array resisters with an opening of a section of the second array. Each friction lining has an opening in register with discrete openings of the sections of the two arrays, and the clutch disc further comprises means for fastening the sections of the two arrays of sections to the adjacent friction linings. Such fastening means includes first and second rivets for each section of the first array; each first rivet extends extends through the first opening of a section of the first array and through the first opening of a section of the second array as well as through the registering openings of the friction linings to connect the section of the first array to the adjacent friction lining, and each second rivet extends through the second opening of a section of the first array and through the second opening of a section of the second array as well as through the registering openings of the friction linings to connect the section of the second array to the adjacent friction lining.

The friction linings are rotatable about a common axis and are movable axially toward and away from each other; at least one of the friction linings is tiltable relative to a fulcrum defined by a (blocking) means for limiting the movability of the friction linings toward each other. The blocking or limiting means can be provided on at least one of (a) the friction linings and (b) the resilient cushion.

The novel features which are considered as characteristic of the invention are set forth in particular in the appended claims. The improved clutch disc itself, however, both as to its construction and the mode of assembling and utilizing the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
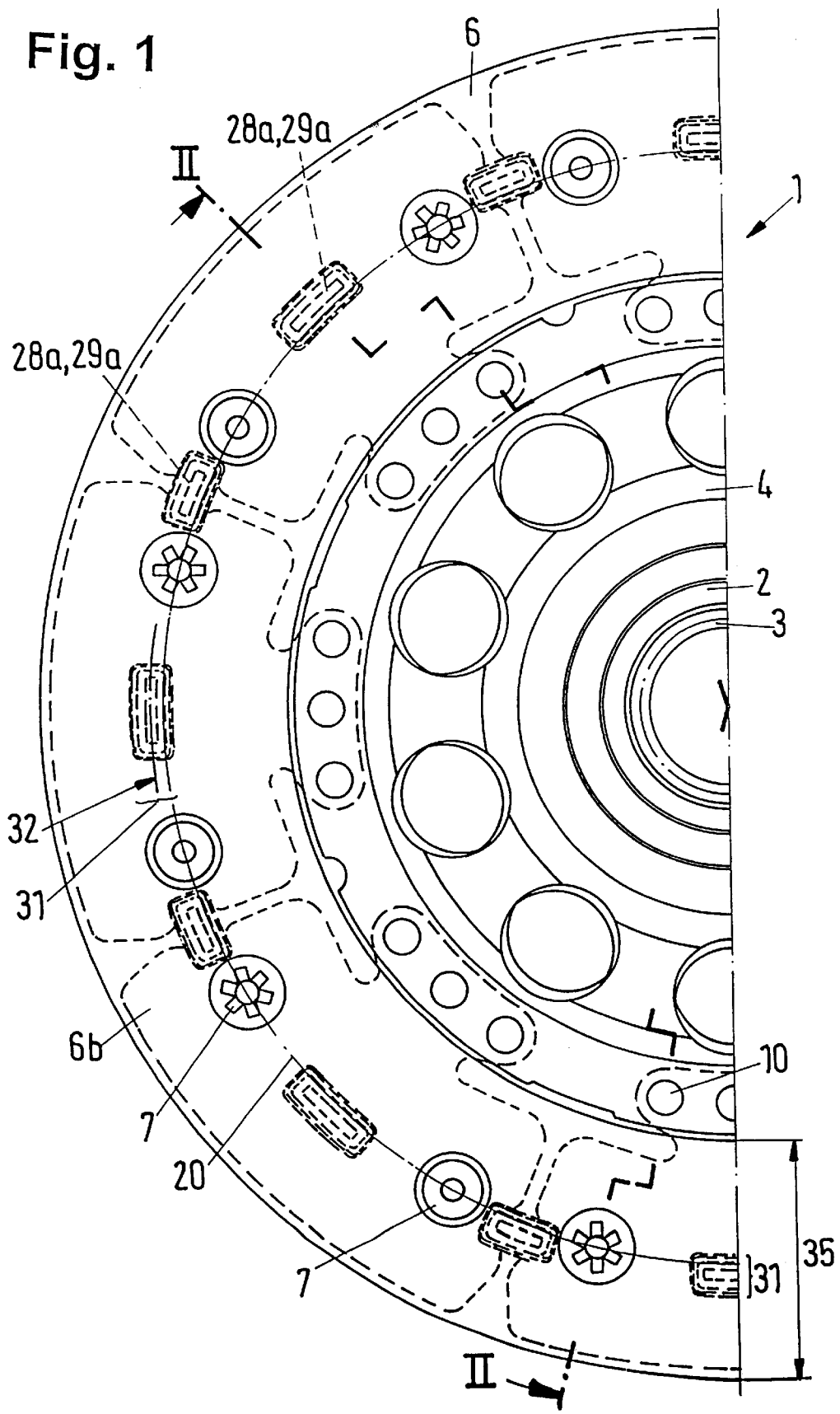
FIG. 1 is a fragmentary elevational view of a clutch disc which embodies one form of the invention.
Figure 2:
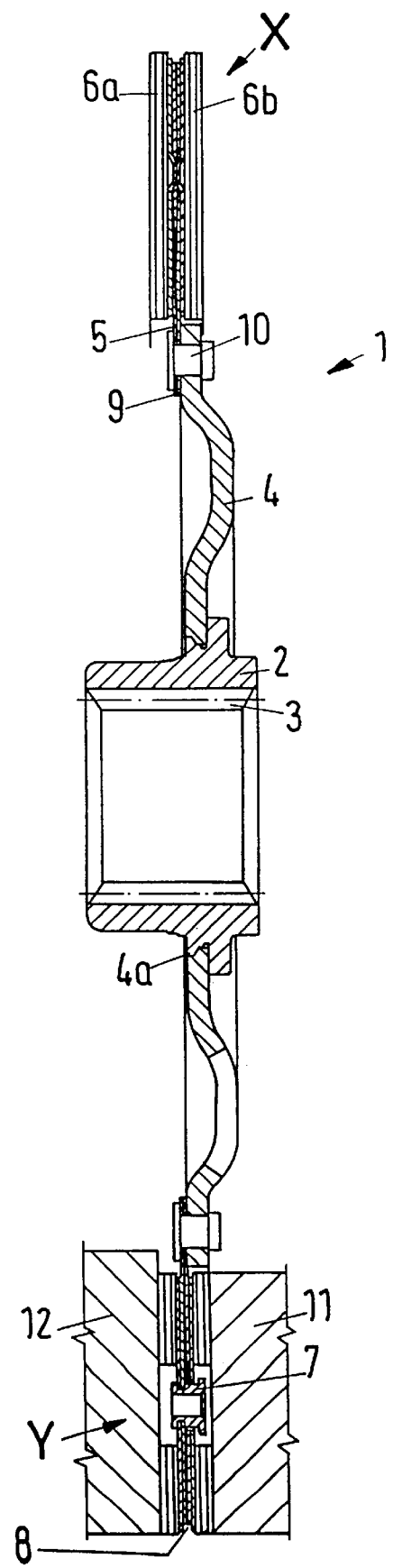
FIG. 2 is a cross-sectional view substantially as seen in the direction of arrows from the line II—II of FIG. 1.

FIGS. 1 and 2 show a clutch disc 1 comprising a support which constitutes a rotary output element of the clutch disc and includes an internally splined hub 2 carrying a radially outwardly extending disc-shaped flange 4. The internal teeth or splines 3 of the hub can mate with the external splines or teeth of a shaft (not shown) which is to receive torque from, or which is to transmit torque to, the clutch disc 1. For example, the just mentioned shaft can constitute the input shaft of a variable speed transmission in the power train of a motor vehicle.

The torque transmitting connection between the flange 4 and the hub 2 of the support of the clutch disc 1 is shown at 4a; this connection comprises mating deformed portions of an external collar on the hub 2 and the adjacent radially inner portion of the flange 4. However, it is equally possible to weld or otherwise non-rotatably connect the parts 2 and 4 to each other.

The radially outer portion of the flange 4 carries a resilient cushion 5 which, in turn, carries a friction lining arrangement 6 including two annular washer-like friction linings 6a and 6b. The friction linings are affixed to the cushion 5 by an annular array of fasteners 7 here shown as rivets 7. The radially inner portion of the resilient cushion 5 is secured to the radially outer portion of the flange 4 by an annular array of groups of rivets 10 (each group contains three equidistant rivets 10, as seen in the circumferential direction of the flange 4).

The resilient cushion 5 which is shown in FIGS. 1 and 2 comprises an annular arrangement of resilient segments 8 each of which contains two identical or substantially identical sections 8a, 8b arranged back-to-back. The sections 8a together form a first half of the resilient cushion 5, and such first half is adjacent that (inner) side of the friction lining 6a (see FIG. 3) which confronts the other friction lining 6b. Analogously, the sections 6b form a second half of the resilient cushion 5, and such second half is adjacent the inner side of the friction lining 6b. The sections 8a, 8b of the composite cushion 5 have radially inner portions 9 which are secured to the radially outermost portion of the flange 4 by the aforementioned rivets 10.

Figure 3:
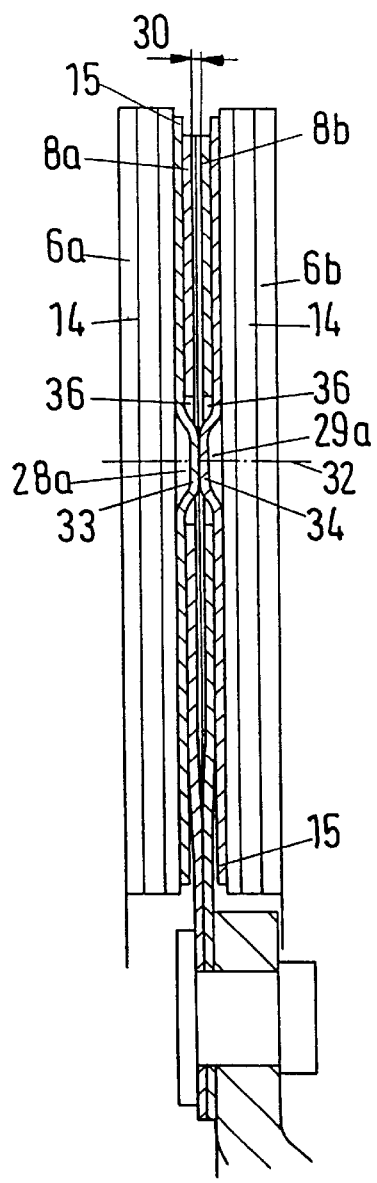
FIG. 3 is an enlarged view of a detail (indicated by arrow X in FIG. 2) with the two friction linings located at a minimal axial distance from each other.

Resilient cushions of the type shown in FIGS. 1 to 3 are disclosed, for example, in German patents Nos. 21 11 892 and 14 25 186 as well as in published German patent applications Serial Nos. 19 20 242 and 43 00 665.

However, the invention can be embodied, with equal or similar advantage, in clutch discs which employ simpler resilient cushions that need not have pairs of sections of the type shown at 8a, 8b. Reference may be had, for example, to German patent No. 36 18 878 and to published German patent applications Serial Nos. 39 39 120 and 36 19 894. Basically, the difference between the resilient cushion 5 which is shown in FIGS. 1 to 3 of the present application and those shown and described in the Just enumerated patent and patent applications is that the prior proposals employ one-piece sections each replacing two overlapping sections 8a, 8b of the improved clutch disc 1.

The disclosures of all US and foreign patents and patent applications which are identified in the specification of the present application are incorporated herein by reference.

It is further within the purview of the present invention to replace the discrete pairs of resilient sections 8a, 8b with one-piece sections each of which has a pair of discrete major (radially outer) portions performing the functions of the discrete sections 8a, 8b and a radially inner portion (radially inwardly of or replacing the portion 9 shown in FIG. 2) which is secured to the rim of the flange 4 by rivets 10 or in any other suitable way.

FIGS. 1 and 2 show a clutch disc 1 wherein the friction linings 6a, 6b and the sections 8a, 8b of the resilient cushion 5 jointly constitute the input element and the parts 2–4 jointly constitute the output element of the clutch disc. However, the present invention can be embodied with equal advantage in clutch discs wherein the input and output elements are connected with each other by a suitable torsional vibration damper, e.g., a damper which operates between the friction linings 6a, 6b on the one hand, and the flange 4 or the hub 2 on the other hand. Such types of torsional vibration damping clutch discs can compensate for or counteract abrupt peaks in the magnitude of torque being transmitted, for example, from the output shaft of an engine to the input shaft of a variable-speed transmission in the power train of a motor vehicle. Clutch discs of such character are fully disclosed in several of the afore-enumerated US and foreign patents and patent applications.

FIG. 2 further shows two additional portions of a friction clutch which can employ the improved clutch disc 1. Such additional portions include an axially movable pressure plate 11 and an axially fixed rotary counterpressure plate 12. The latter can constitute a flywheel which can be affixed (either directly or indirectly) to the output shaft of an internal combustion engine and which is normally designed to transmit torque to the pressure plate 11 as well as to the housing or cover 39a (shown in FIGS. 9 and 10) of the friction clutch.

FIGS. 2 to 5 show the clutch disc 1 in a condition it assumes when the friction clutch is fully engaged, i.e., when the plates 11, 12 bear upon and frictionally engage the adjacent exposed surfaces of the respective friction linings 6b, 6a with a force which suffices to ensure that the clutch disc rotates at the exact speed of the counterpressure plate or flywheel 12. At such time, the resilient cushion 5 stores a maximum amount of energy and tends to move the friction linings 6a, 6b apart as seen in the direction of their common axis X—X (shown in FIG. 2). The cushion 5 causes the friction linings 6a, 6b to move axially and away from each other to the positions shown in FIG. 6 when the clutch is disengaged, i.e., when the plates 11, 12 can turn relative to the clutch disc 1 and/or vice versa. At such time, the illustrated sections 8a, 8b of the cushion 5 are also located at a maximum axial distance (shown at 13) relative to each other. On the other hand, and as can be seen in FIG. 3, the neighboring (overlapping) sections 8a, 8b of the cushion 5 are located at a minimum axial distance (shown at 30) from each other when the friction clutch is fully engaged, i.e., when the friction linings 6a, 6b are in such frictional engagement with the adjacent annular friction surfaces of the plates 11, 12 that the parts 1, 11 and 12 rotate as a unit.

Each of the friction linings 6a, 6b comprises an annular friction generating portion 14 (see, for example, FIGS. 3 and 6) and a reinforcing carrier 15 which can be made of a suitable metallic sheet material or of any other suitable material (such as a synthetic plastic substance) which exhibits the required strength and other desirable characteristics. The annular portions 14 can be bonded (by an adhesive), baked and/or otherwise reliably affixed to the adjacent sides of the respective reinforcing carriers 15. The mounting of the annular portions 14 and their carriers 15 in an assembled clutch disc 1 is such that the carriers 15 are adjacent those (inner) sides of the annular portions 14 which confront each other, i.e., the two carriers 15 flank the annular arrays of sections 8a, 8b forming part of the resilient cushion 5.

Figure 5:
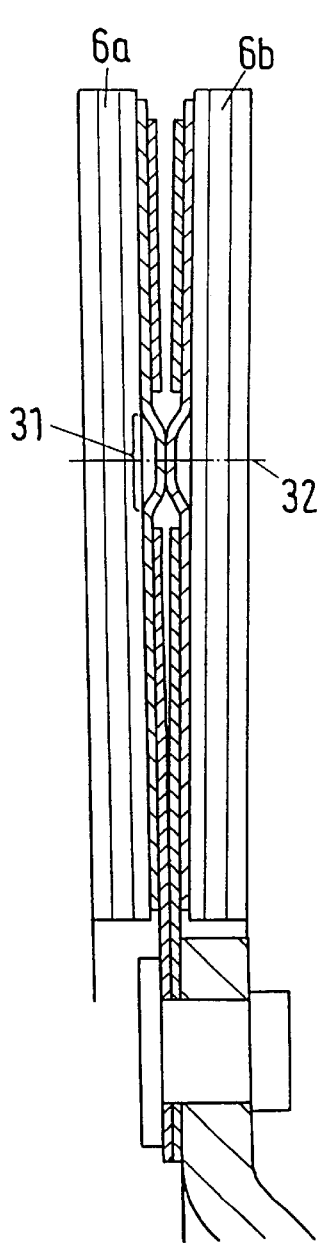
FIG. 5 is a view identical to that of FIG. 4 except that the two friction linings are tilted relative to each other to mutual positions in which their radially innermost portions are nearer to each other than their radially outermost portions.
Figure 6:
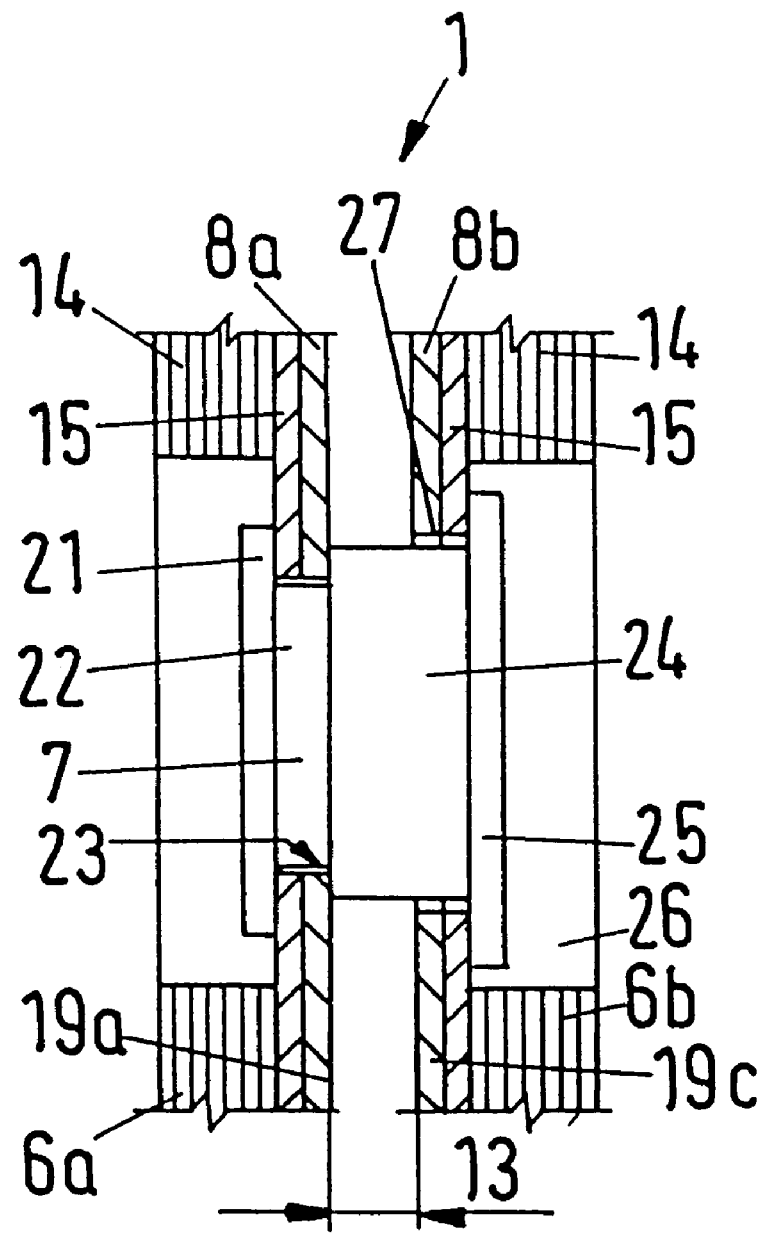
FIG. 6 is an enlarged view of a detail (indicated by arrow Y in FIG. 2) showing the two friction linings at a maximum distance from each other.
Figure 7:
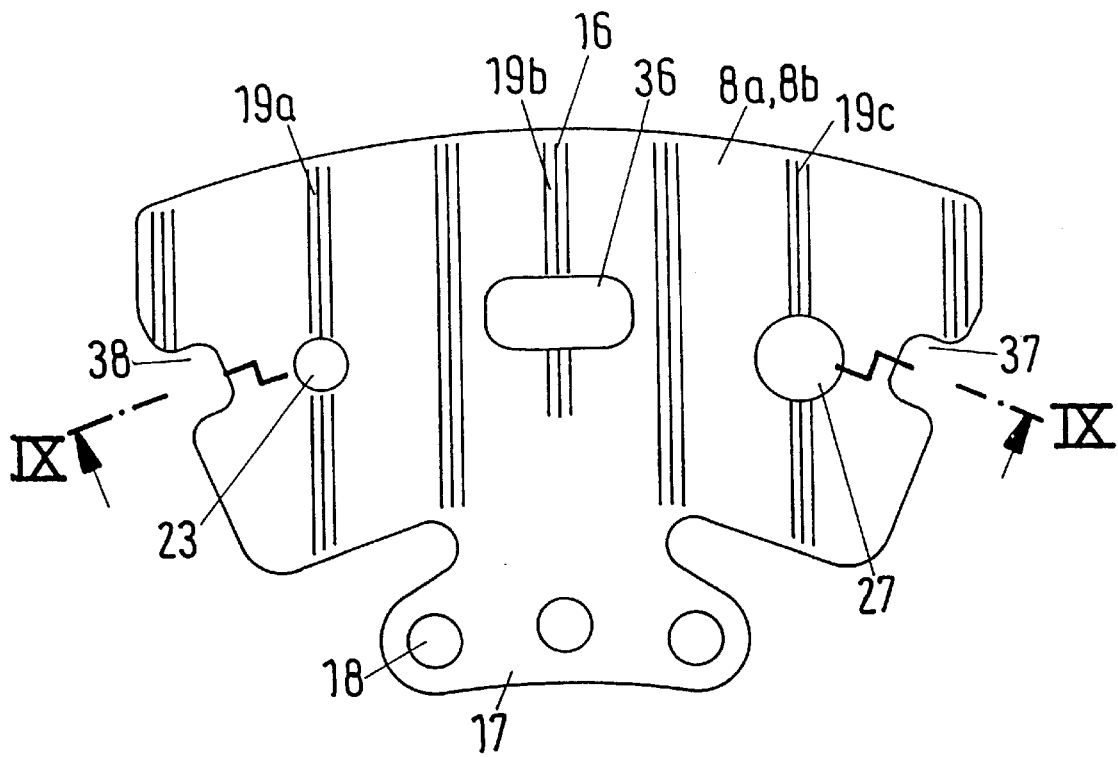
FIG. 7 is an elevational view of one presently preferred form of a section forming part of the resilient cushion between the friction linings.
Figure 8:
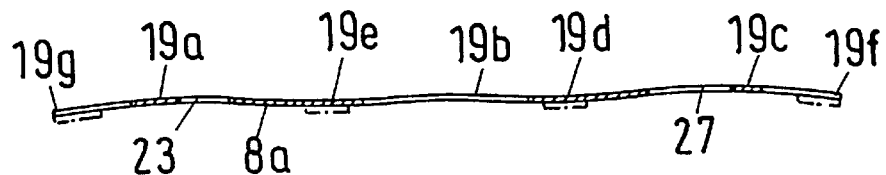
FIG. 8 is a sectional view substantially as seen in the direction of arrows from the line VIII—VIII of FIG. 7.

FIGS. 7 and 8 show one of the presently preferred sections 8a, 8b which can be utilized in the clutch disc 1 of FIGS. 1 to 6. Each such section has two halves which are mirror images of each other with respect to a radially extending plane 16 (indicated in FIGS. 7 and 8 by dot-dash lines) which includes the axis X—X of the clutch disc 1. Each of the sections 8a, 8b comprises a radially inner portion 17 having a set of three equidistant circular openings 18 for the shanks of the aforementioned rivets 10. FIGS. 7 and 8 show that each of the sections 8a, 8b has a plurality of raised portions in the form of corrugations (including those denoted by the characters 19a, 19b and 19c) which are or can be parallel to the plane 16 and which constitute projections or abutments for the adjacent friction lining 6a or 6b (at least in one of the engaged and disengaged conditions of the friction clutch). More specifically, the projections or corrugations including those shown at 19a–19c can come into or are in actual contact with the adjacent sides of the reinforcing carriers 15 of the respective friction linings.

When two sections 8a, 8b of the cushion 5 are properly positioned relative to each other (i.e., when they accurately overlap each other), they are located back-to-back so that their projections or corrugations including the corrugations 19a–19c face away from each other, namely toward the carriers 15 of the adjacent friction linings 6a, 6b. The corrugation 19a of one of the overlapping sections 8a, 8b is located opposite the corrugation 19c of the other section, and the corrugations 19b of such sections are located opposite each other. The height of the corrugations 19a, 19c need not be constant; for example, such corrugations can have raised median portions on a circle 20 having its center on the axis X—X and halving or practically halving the major radially outer portions of the sections 8a and 8b. The raised median portions of the corrugations 19a, 19c are provided with openings in the form of circular holes 23, 27 which serve to receive portions of the rivets 7, i.e., of the means for fastening the sections 8a, 8b to the carriers 15 of the neighboring friction linings 6a and 6b.

FIG. 1 shows that the rivets 7 form a single annulus of equidistant pairs of rivets 7; the circle 20 is located at the central portion of such annulus (as seen in the radial direction of the clutch disc 1). Furthermore, the mounting of the rivets 7 of each pair of neighboring rivets is such that the head 21 of one of these rivets is accessible at one side of the respective pair of overlapping sections 8a, 8b but the head 21 of the other rivet 7 of the respective pair is accessible at the other side of the pair of overlapping sections 8a, 8b. The reason is that one rivet 7 of each pair of neighboring rivets connects the friction lining 6a or 6b with one of the sections 8a, 8b whereas the other rivet of such pair connects the same friction lining 6a or 6b with the other of the sections 8a, 8b.

FIG. 6 shows the manner in which one of a pair of neighboring rivets 7 connects the section 8a of a pair of sections 8a, 8b to the carrier 15 of the adjacent friction lining 6a. The rivet 7 which is shown in FIG. 6 has a head 21 which overlies the outer side of the carrier 15 of the friction lining 6a. A first (smaller diameter) shank 22 of the rivet 7 extends through the opening 23 of the section 8a, and a (larger-diameter) second shank 24 of the rivet extends through the larger-diameter opening 27 of the section 8b. A second head 25 of the rivet 7 overlies the outer side of the carrier 15 of the friction lining 6b. The shoulder between the shanks 22, 24 abuts that side of the section 8a which confronts the section 8b so that the rivet 7 non-movably couples the adjacent portions of the section 8a and the carrier 15 of the friction lining 6a to each other. On the other hand, the section 8b and the adjacent portion of the carrier 15 of the friction lining 6b are movable axially along the larger-diameter shank 24 of the rivet which is depicted in FIG. 6.

The configuration of the other rivet of the pair including the rivet 7 of FIG. 6 is identical except that the other rivet is inverted (see FIG. 1) because it serves to connect the carrier 15 of the friction lining 6b with the section 8b of the cushion 5 while permitting the adjacent portions of the section 8a and the carrier 15 of the friction lining 6a to move axially of the other rivet toward and away from the section 8b.

It goes without saying that the annular portions 14 of the friction linings 6a, 6b, as well as their reinforcing carriers 15, are also provided with openings which register with the respective pairs of aligned openings 23, 27 to permit insertion and upsetting of the rivets 7 in a manner as described with reference to FIG. 6. The axial length of the larger-diameter shank 24 of each rivet can but need not be selected in such a way that, when the clutch disc 1 need not transmit torque, the resilient sections 8a, 8b of each such pair store little energy or no energy at all.

A rivet 7 which is to be installed in a manner as shown in FIG. 6 is without the head 21; this enables a person or a machine to insert the rivet 7 in a direction to the right until the head 25 abuts the adjacent portion of the outer side of the carrier 15 forming part of the friction lining 6b. The annular shoulder between the shanks 22, 24 then maintains the section 8a at a desired axial distance from the carrier 15 of the friction lining 6b. The next step involves an upsetting of the free end of the shank 22 so that the section 8a and the carrier 15 of the friction lining 6a cannot move axially of the thus inserted and deformed rivet 7. That opening or window of the annular portion 14 of the friction lining 6b shown in FIG. 6 which receives the head 25 is denoted by the character 26. As already mentioned above, the shank 24 of the rivet extends through the larger-diameter opening 27 of the section 8b, and the shank 22 extends through the smaller-diameter opening 23 of the section 8a. FIG. 6 further shows that the rivet 7 merely connects the section 8a to the carrier 15 (but not to the annular portion 14) of the respective friction lining 6a.

As can be seen in FIGS. 1 to 5, those sides of the friction linings 6a, 6b which confront each other (across the respective pairs of sections 8a, 8b) are respectively provided with projections 28a, 29a which abut each other when the clutch disc 1 is stressed, i.e., when the axially movable pressure plate 11 of the friction clutch is sufficiently close to the axially fixed counterpressure plate or flywheel 12. The purpose of the projections 28a, 29a is to limit the extent of axial movability of the sections 8a, 8b of each pair of such sections toward each other, i.e., to ensure that the minimum axial distance between the sections 8a, 8b of each pair of such sections is not reduced to less than the clearance or gap 30 shown in FIG. 3.

As can be seen in FIG. 1, the pairs of cooperating projections 28a, 29a together form an annular array which constitutes a fulcrum or tilting zone 31 for the friction linings 6a and 6b. The width of the fulcrum 31 (as measured in the radial direction of the clutch disc 1) is such that the circle 32 passing substantially midway between the radially inner and radially outer portions of the fulcrum has a diameter which is close to that of the circle 20 defined by the axes of the annular array of rivets 7.

Figure 4:
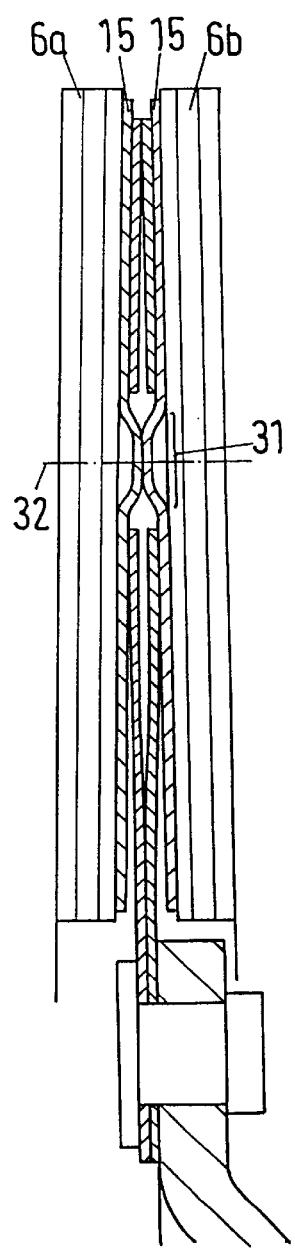
FIG. 4 is an enlarged view similar to that of FIG. 3 but with the two friction linings tilted relative to each other at the fulcrum in a sense that their radially outermost portions are nearer to each other than their radially innermost portions.

By pivoting relative to each other at the annular fulcrum 31, the friction linings 6a, 6b can assume frustoconical shapes, i.e., the conicities of their external surfaces which can be engaged by the plates 11, 12 can vary between those shown in FIG. 4 and those shown in FIG. 5. The width of the gap 30 shown in FIG. 3 is selected in such a way that it does not decrease appreciably, e.g., all the way down to zero, even when the conicities of the friction linings reach the magnitudes which are shown in FIGS. 4 and 5. Otherwise stated, the radially innermost or the radially outermost portions of the sections 8a, 8b of each and every pair of such sections preferably should not touch, but they certainly should not bear against each other with any appreciable force, due to changes of conicity of the friction linings 6a and 6b.

The fulcrum 31 which is shown in FIGS. 1 to 5 is but one example of various fulcra which can be resorted to in order to enable the friction linings 6a, 6b to tilt or pivot relative to each other and to thus assume frustoconical shapes (FIGS. 4 and 5) or to change their conicities. For example, the projections 28a or 29a can be omitted if the dimensions of the remaining annulus of projections (as seen in the direction of the axis X—X) is increased accordingly. Furthermore, the projections 28a need not abut the confronting projections 29a because it is equally possible to distribute the projections 28a in such a way that they alternate with the projections 29a in the circumferential direction of the fulcrum. Such modification, too, necessitates the utilization of projections having a height approximating or matching twice the height of the illustrated projections 28a and 29a.

Still further, and as can be seen in FIG. 1, the length of all of the projections 28a and/or 29a need not be the same. FIG. 1 shows that pairs of abutting relatively long projections 28a, 29a alternate with pairs of abutting relatively short projections. Furthermore, a relatively short projection 28a can abut a longer projection 29a or vice versa.

The fulcrum 31 can be said to constitute or form part of a means for blocking movements of the friction linings 6a, 6b toward each other beyond the positions shown in FIG. 3 in which the width of the clearance or gap 30 assumes its minimum desirable or acceptable value. The projections 28a and 29a are integral with the respective carriers 15, i.e., they constitute deformed or displaced portions of the respective carriers, and the deformation is carried out in such a way that the thus obtained projections 28a, 29a extend toward each other and can actually contact each other because the sections 8a, 8b of each pair of sections of the cushion 5 are provided with suitably configurated openings or windows 36 (see FIGS. 3 and 7).

The width of the fulcrum 31 which is shown in FIG. 1 (as measured radially of the clutch disc 1) can be in the range of between about 10% and 20% of the width (shown at 35) of the friction lining 6a or 6b (and especially of the annular friction generating portion 14 of a friction lining). However, the upper or lower limit of such range can be exceeded (i.e., above 20% or to less than 10%) in certain types of clutch discs, i.e., in clutch discs which are to be utilized in certain types of friction clutches.

The diameter of the annular center line 32 of the fulcrum 31 which is shown in FIG. 1 is or can be close to or can match 50% of the sum of inner and outer diameters of a friction lining 6a or 6b. However, here again, this relationship can vary upwardly or downwardly, i.e., above or to less than 50%. As already mentioned hereinbefore, the diameter of the circle 20 defined by the axes of the annular array of rivets 7 can equal or approximate the diameter of the circular center zone 32 of the fulcrum 31. In FIG. 1, the diameter of the circle 20 is slightly less than that of the annular center zone 32.

The rivets 7 alternate with pairs of cooperating projections 28a, 29a as seen in the circumferential direction of the fulcrum 31.

The width of the minimum clearance 30 shown in FIG. 3 depends upon a number of parameters, particularly upon the extent of thermally induced deformation of the plates 11 and 12 of the friction clutch. For example, when the clutch disc 1 is utilized in or in conjunction with friction clutches which are to be installed in the power trains of passenger cars, the minimum width or clearance 30 can be in the range of between 0.1 and 0.7 mm, especially within the range of between 0.2 and 0.5 mm. These are two presently preferred ranges regarding the selected width of the clearance 30.

FIG. 3 merely shows one window or opening 36 in each of the two overlapping sections 8a, 8b of the cushion 5. Actually, and as shown in FIGS. 1 and 7, each of the sections 8a, 8b can be provided with three cutouts or windows or openings 36, 37 and 38. The cutout or window 36 can receive and permit the passage of an entire projection 28a or 29a. On the other hand, a cutout 37 of one of the sections 8a, 8b cooperates with the cutout 38 of the neighboring coplanar (not overlapping) section 8a or 8b to jointly define a window which is sufficiently large to permit two projections 28a, 29a to abut each other and to thus form a portion of the annular fulcrum 31. The window 36 and/or the cutout 37 or 38 may but need not have a polygonal (e.g., rectangular) outline. The combined dimensions of a window including a cutout 37 and the adjacent cutout 38 are shown as being (but need not be) less than the dimensions of a centrally located window 36. Such dimensions are determined by the dimensions of the corresponding pair of abutting projections 28a, 29a.

It has been ascertained that the operation of the improved clutch disc 1 is highly satisfactory if the clearance 13 between the radially inner portions of the sections 8a, 8b is between about 50% and 80% of the maximum axial movement possible under the action of such sections. The maximum possible movement or displacement is achieved when the sections 8a, 8b are completely or practically flat. In many instances, the aforementioned clearance can amount to between 60% and 70% of the maximum possible distance covered under the bias of the sections 8a, 8b.

The following is a description of the purpose and of the advantages of the aforedescribed features of the clutch disc 1 which is shown in FIGS. 1 to 8:

When a motor vehicle is started, especially if the acceleration of the vehicle from zero speed is abrupt, the friction clutch (e.g., a clutch between the output shaft of the engine and the input shaft of the transmission in the power train of the vehicle) develops large or very large quantities of friction heat as a result of frictional engagement of the plates 11, 12 with and rotation of such plates relative to the adjacent exposed surfaces of the friction linings 6a and 6b. The thus developing friction heat entails an often pronounced rise of temperature of the entire clutch including the pressure plate 11 and the counterpressure plate 12. As a rule, the transfer of heat between the annular portions 14 of the friction linings 6a, 6b and the adjacent friction surfaces of the plates 12, 11 is not uniform. This is attributable in part to the design of such plates, i.e., the design is not or is not always selected with a view to ensure uniform transfer of heat between the parts 11, 12 on the one hand, and the friction linings 6b, 6a on the other hand. In other words, the plates 11 and 12 are not (or not always) designed to enhance uniform heat transfer between their friction surfaces and the adjacent exposed surfaces of the respective friction linings.

Figure 9:
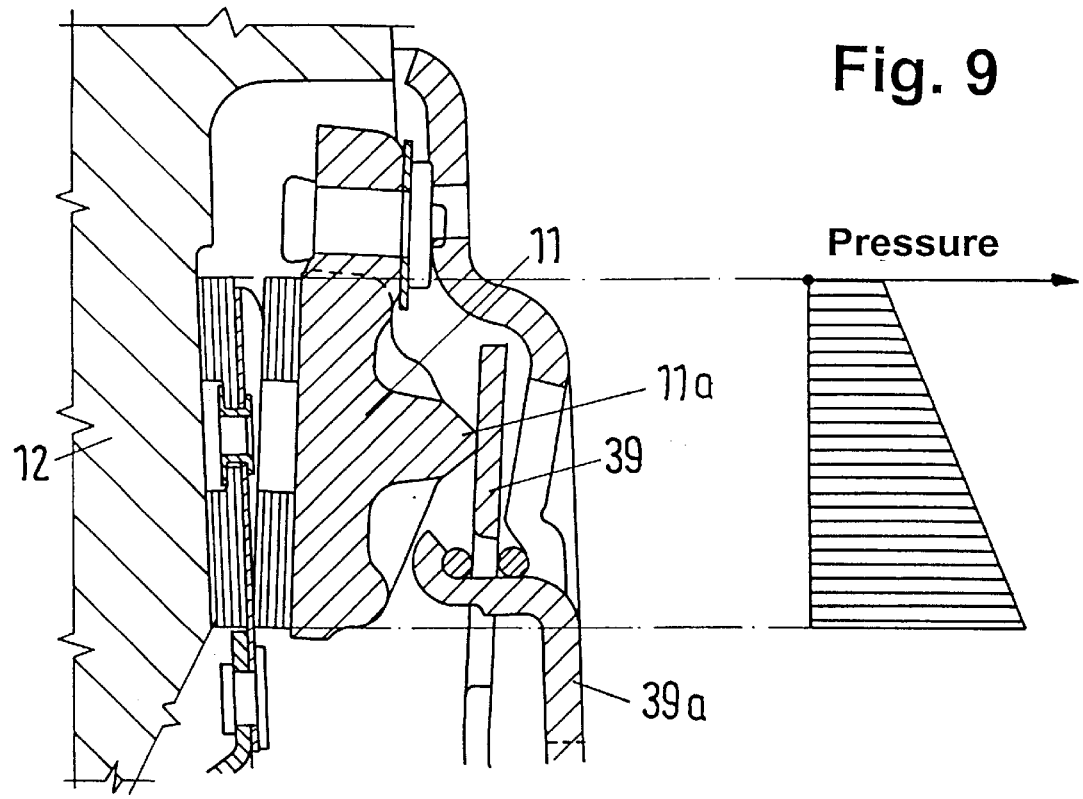
FIG. 9 is a fragmentary axial sectional view of a friction clutch with the friction linings of its clutch disc tilted to positions corresponding to those shown in FIG. 5.
Figure 10:
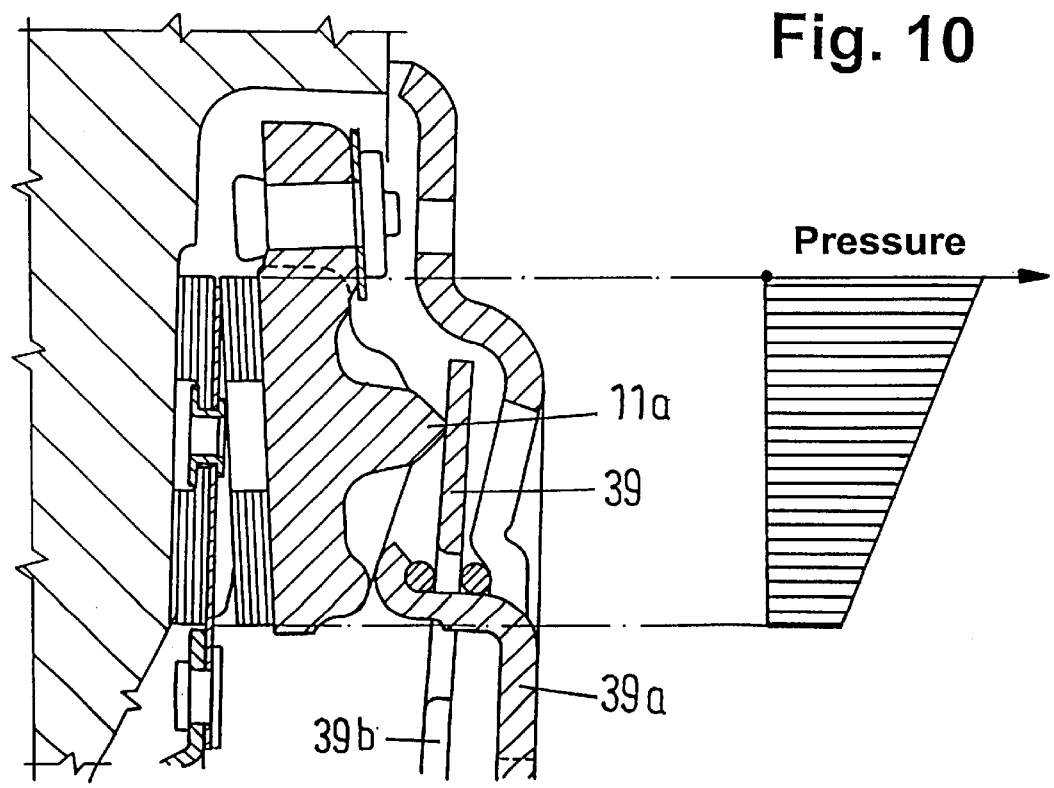
FIG. 10 is a view similar to that of FIG. 9 but with the friction linings tilted to positions corresponding to those shown in FIG. 4.

The normally developing deformations of the plates 11 and 12 are shown in FIGS. 9 and 10. As a rule, abrupt heating of the clutch including such plates entails the development of a conicity (or of a more pronounced conicity) of that surface of the pressure plate 11 which contacts the adjacent friction lining. Such conical surface has an imaginary apex at the axis of the friction clutch and its clutch disc, and the friction linings diverge in a direction from the axis toward the periphery of the housing 39a of the clutch. The conicity of the friction surface of the pressure plate 11 and of the adjacent friction lining can be termed a negative conicity. On the other hand, the conicity of the pressure plate 11 and of the adjacent friction lining in the clutch of FIG. 10 is a so-called positive conicity; it develops during subsequent cooling of the friction clutch (namely during complete disengagement or during slippage-free frictional engagement between the plates 11, 12 and the respective friction linings).

The friction surface of the counterpressure plate (flywheel) 12 is also likely to develop a certain amount of conicity which, however, need not always be as pronounced as that of the pressure plate 11.

A drawback of conventional clutch discs (the part of the clutch disc shown in each of FIGS. 9 and 10 is assumed to be that of a conventional clutch disc without a fulcrum 31) is that the deformation during or as a result of heating of the friction clutch entails a highly unsatisfactory distribution of pressure between the pressure plate 11 and the adjacent friction lining; this is shown in the right hand-portion of FIG. 9. It will be seen that the pressure between the friction surface of the plate 11 and the adjacent friction lining increases rather gradually toward the axis of the friction clutch; this reduces the likelihood of predictable engagement and partial engagement of the clutch. In other words, the clutch is likely to slip under circumstances when it is expected to rotate the clutch disc at the exact RpM of the pressure plate 11 and counterpressure plate 12.

The pressure between the plates 11, 12 and the adjacent friction linings of a conventional clutch disc during cooling of the friction clutch varies in a manner as illustrated in the right-hand portion of FIG. 10, i.e., the pressure is least pronounced at the radially innermost portions of the friction linings and increases gradually toward their radially outermost portions. This, too, can be a cause of unpredictable operation of the friction clutch.

Another problem which develops in conventional friction clutches of the type shown in FIGS. 9 and 10 (i.e., in clutches employing conventional clutch discs without fulcra 31) is that the operating point of the clutch spring 39 (such as a standard diaphragm spring) is shifted as a result of displacement of the locus of abutment between the radially outermost portion of the spring 39 and the adjacent raised portion 11*a* of the plate 11 and as a result of change of conicity of the clutch spring 39. This gives rise to an undesirable axial displacement of the radially inwardly extending tongues or prongs 39*b* forming part of the clutch spring and serving as a means for engaging or disengaging the clutch. As a rule, the tips of the tongues 39*b* cooperate with a release bearing (not shown) which causes the spring 39 to change its conicity if the clutch is to be disengaged. The timing of such disengagement is changed in response to a change of the axial positions of the tips of the prongs or tongues 39*b* as a result of a change of conicity of the spring 39 in response to a change or the development of conicity of the friction surfaces of the plates 11 and 12. This normally or often results in a reduction of the pressure between the friction surfaces of the plates 11, 12 and the adjacent friction linings of a standard clutch disc.

The improved clutch disc 1, which embodies the aforediscussed blocking or movability limiting means defining the tilting zone 31 renders it possible to compensate, either entirely or to a substantial extent, for deformation of the counterpressure plate 12 and/or of the pressure plate 11 as a result of heating and/or cooling of the device (friction clutch) which employs the clutch disc. As already explained hereinbefore, the novel clutch disc is designed in such a way that it does not interfere with, and is not adversely affected by, changes of conicity of the plate 11 and/or 12 by the novel expedients of providing the clearance 30 and of providing the annular fulcrum or tilting-zone 31.

The ability of the improved clutch disc 1 to effectively counteract the changes of conicity of the plate 11 and/or 12 can be enhanced by appropriate selection of the diameter of the annular center line 32 of the fulcrum 31 and/or the stiffness of the sections 8*a*, 8*b* of the resilient cushion 5. The result is a more uniform distribution of pressures between the plates 11, 12 and the adjacent portions 14 of the respective friction linings, i.e., the pressure is more uniform (as seen in the radial direction of the friction linings) than those indicated in the right-hand portions of FIGS. 9 and 10.

The clearance 30 ensures that, depending on the direction of change or development of conicity of the friction surfaces of the plates 11 and 12, the radially inner portions of the friction linings of the improved clutch disc can yield when the change or development of conicity is attributable to heating (FIG. 9), and the radially outermost portions or regions of the friction linings can yield in response to a change or the development of conicity attributable to cooling (FIG. 9).

FIGS. 4 and 5 further show that the improved clutch disc not ony enables its friction linings to yield (at the radially outermost regions as shown in FIG. 4 or at the radially innermost regions as shown in FIG. 5) but that, at the same time, the radially innermost portions are free to expand when the radially outermost portions are compressed and vice versa. This important feature renders it possible to achieve the aforediscussed highly satisfactory (more uniform) distribution of pressures as seen in the radial direction of the annular portions 14 of the two friction linings. The circumstances shown in FIG. 5 develop during heating of the clutch embodying the improved clutch disc, and the circumstances shown in FIG. 4 arise during cooling of the clutch. Thus, when the friction linings 6*a*, 6*b* assume the positions shown in FIG. 5, the deformation of the plates 11, 12 corresponds to that shown in FIG. 9, and the deformation of the two plates corresponds to that shown in FIG. 10 when the friction linings assume the positions shown in FIG. 4.

In the embodiment which is shown in FIGS. 1 to 6, the fulcrum 31 is defined by the portions 28*a*, 29*a* of the two carriers 15, i.e., by portions of the friction linings 6*a* and 6*b*. However, it is equally within the purview of the invention to provide the fulcrum on the resilient cushion 5, i.e., on the set of sections 8*a* and/or on the set of sections 8*b*. Furthermore, the constituents of a fulcrum which is defined by the resilient cushion can form part of the sections 8*a* and/or 8*b*, or they can be separately produced parts which are affixed to some or all of the sections 8*a* and 8*b*. For example, the sections 8*a* and/or 8*b* can be provided with integral projections during the making of such sections or thereafter, e.g., in a stamping or other suitable upsetting or deforming machine.

Referring again to FIG. 8, the section 8*a* which is shown therein has raised portions or projections which are provided in the valleys or recessed portions 19*d*, 19*e*, 19*f* and 19*g* of the section. Such raised portions can cooperate with confronting raised portions of the other section of the pair of sections including the section of FIG. 8*a* to jointly form an annular fulcrum replacing or being provided in addition to the aforedescribed and discussed fulcrum 31. The (non-referenced) projections in the valleys 19*d*–19*g* of the section 8*a* of FIG. 8 are indicated by dot-dash lines.

If the fulcrum which is defined by the resilient cushion 5 includes a first set of projections on the sections 8*a* and a second set of projections on the sections 8*b*, the projections of the sections 8*a* can abut or they can alternate with the projections of the sections 8*b* (i.e., the same as already described in connection with the making of the fulcrum 31 by the parts of the friction linings). It is equally possible to provide adequately dimensioned projections only on the sections 8*a* or only on the sections 8*b*, as long as such projections can establish a satisfactory clearance corresponding to that shown at 30 in FIG. 3.

In accordance with a further advantageous feature of the invention, the characteristics or characteristic curves of the sections (such as 8*a*, 8*b* or analogous sections) of the resilient cushion can be selected in such a way that the force which is required for fully flattening the sections is greater than that force which is being applied to the pressure plate (11) by a component part of the friction clutch, normally the clutch spring (such as the diaphragm spring 39 shown in FIGS. 9 and 10). Such selection of the characteristic curves of the sections of the resilient cushion ensures that the sections of the resilient cushion can undergo at least some additional deformation while the friction clutch is fully engaged. In order to accomplish this, the stiffness of the sections of the resilient cushion must be selected in such a way that the aforementioned residual or remaining resiliency suffices to compensate for changes and/or development of conicity of the flywheel 12 and/or pressure plate 11.

It will be seen that the fulcrum or fulcra can be provided on or can form part of the resilient cushion as well as (or alternatively) on one or both friction linings. All that counts is to ensure that the cushion is still capable of yielding when the spacing between the two sets of sections is reduced to a clearance corresponding to the clearance 30 shown in FIG. 3. Regardless of whether the fulcrum is (or the fulcra are) provided on the friction linings and/or on the resilient cushion, it is always advisable to establish the connections between the parts of the cushion and the parts of the friction linings (such as by the rivets 7) in such a way that the sections of the cushion are stressed (even if only slightly) when the clutch is fully disengaged.

Figure 11:
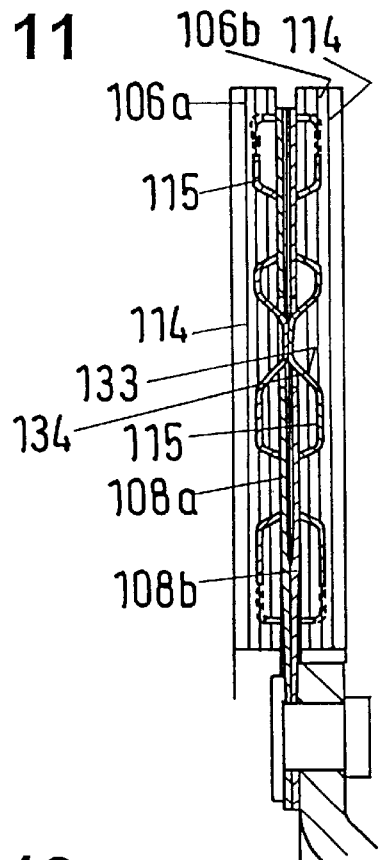
FIG. 11 is a fragmentary axial sectional view of a modified clutch disc wherein the reinforcing members for the friction linings are at least partially embedded in the annular friction generating portions of the respective friction linings.
Figure 12:
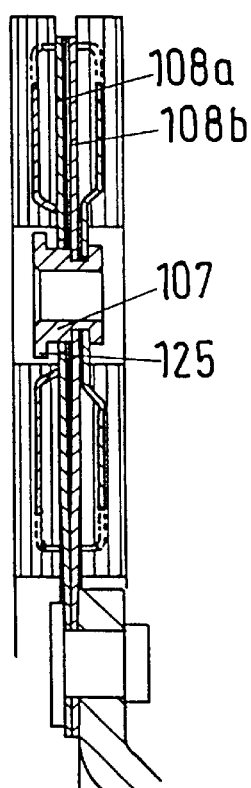
FIG. 12 is another fragmentary axial sectional view of the clutch disc which is shown in FIG. 11.

Each of the modified friction linings 106a, 106b which are shown in FIGS. 11 and 12 comprises an annular washer-like reinforcing carrier 115 which is at least partially (but preferably entirely) embedded in the material of the respective annular friction generating portion 114. In this respect, the friction linings 106a, 106b of FIGS. 11 and 12 resemble those disclosed in published German patent application Serial No. 197 12 203. Reinforcing carriers of the type adapted to be embedded in the annular portions of friction linings for use in friction clutches are disclosed in published German patent application Serial No. 196 26 688. It is to be noted, again, that the disclosures of all US patents, foreign patents and patent applications which are identified in the specification of the present application are incorporated herein by reference.

The reinforcing carriers 115 of the friction linings 106a, 106b respectively comprise projections 133, 134 in the form of beads, dimples or the like; the purpose of these projections is analogous to that of the projections 28a, 29a on the carriers 15 of the friction linings 6a, 6b forming part of the clutch disc 1, or to that of the parts 33, 34 shown in FIG. 3. FIG. 12 shows one of the fasteners 107 which serve to connect the sections 108a. 108b of the resilient cushion in the clutch disc including the friction linings 106a, 106b to the adjacent carriers 115. The fasteners 107 are rivets which can be configurated, inserted and deformed in the same way as described with reference to the rivet 7 of FIG. 6. The shapes and mutual positions of the friction linings 106a, 106b shown in FIGS. 11 and 12 are those which the friction linings assume when the pressure plate and the counterpressure plate (not shown in FIGS. 11 and 12) are not deformed.

The only difference between the manner of mounting the rivet 107 of FIG. 12 and the manner of mounting the rivet 7 of FIG. 6 is that, when the sections 108a, 108b of the resilient cushion in the clutch disc of FIGS. 11 and 12 dissipate energy, the head 125 of the rivet 107 directly abuts the section 108a.

Figure 13:
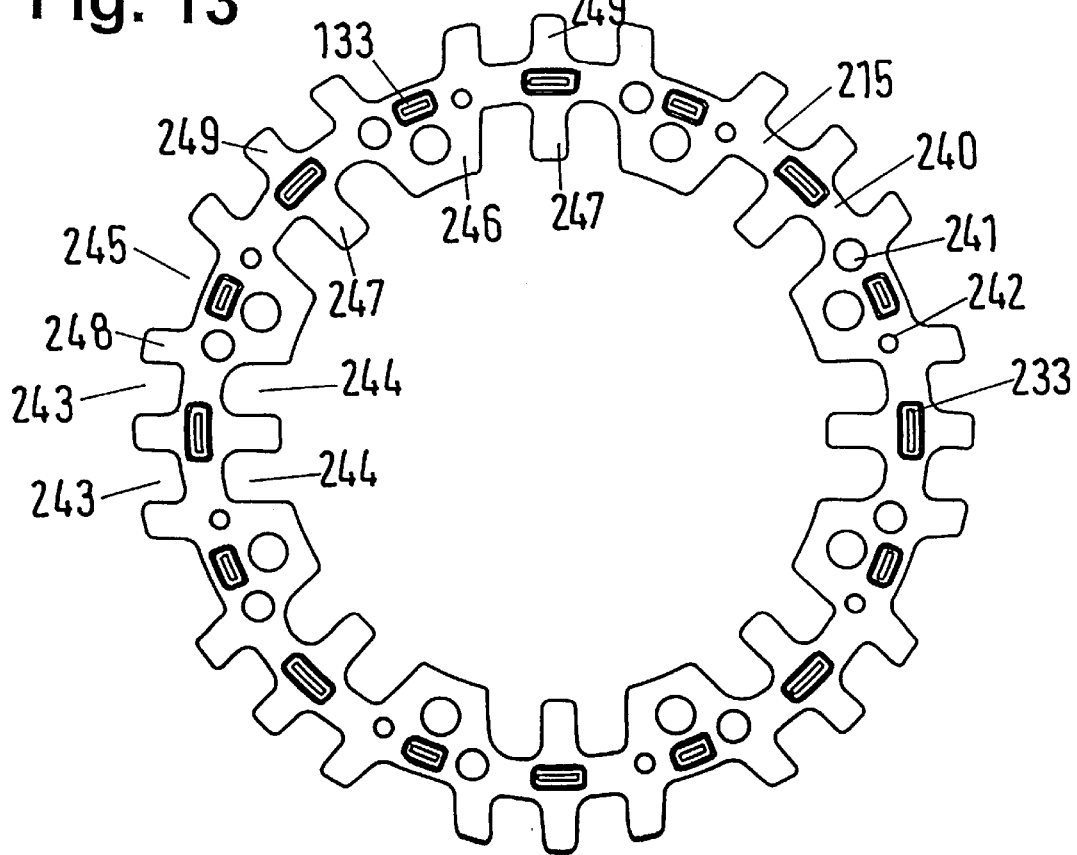
FIG. 13 is an elevational view of a reinforcing member or carrier for use in friction linings forming part of the improved clutch disc.

FIG. 13 shows a further reinforcing carrier 215 which can be utiized in a friction lining of a clutch disc embodying the present invention. This carrier can be utilized in lieu of a carrier 15, i.e., with the annular portion 14 of the corresponding friction lining. The annular portion 14 (which consists of a suitable friction generating material) can be bonded (by a suitable adhesive) to or it can be baked onto the carrier 215.

The carrier 215 of FIG. 13 comprises a circumferentially complete central or median annular portion 240 which is provided with (or which carries) an annular array of axially extending projections 233 in the form of beads, ribs, corrugations of the like. The projections 233 form part of or constitute a fulcrum, i.e., they can perform the function of projections 33 and/or 34 or of projections 133 and/or 134.

The annular median portion 240 is further provided with openings 241, 242 for the shanks of rivets. The arrangement is such that each projection 233 is flanked by a larger-diameter opening 241 and a smaller-diameter opening 242. Otherwise stated, each of the openings 241, 242 is flanked by two projections 233 (as seen in the circumferential direction of the annular portion 240). Each of the openings 241, 242 registers with an opening of the adjacent section (not shown) of the resilient cushion of the clutch disc having two friction linings of the type embodying reinforcing carriers 215 and annular friction generating portions 14. If the reinforcing carrier 215 is utilized in conjunction with a resilient cushion employing pairs of overlapping sections of the type shown in FIG. 7, each opening 242 registers with an opening 23 and each opening 241 registers with an opening 27. The distribution of the projections 233 is then such that they can be received in the openings or windows 36 and 37+38 of the adjacent sections 8a or 8b.

In order to reduce its mass moment of inertia, the carrier 215 has an annulus of radial cutouts 244 extending radially outwardly from its radially innermost portion, and with radial cutouts 243, 245 extending radially inwardly from its radially outermost portion. Pairs of cutouts 243 alternate with discrete cutouts 245. The provision of cutouts 244 results in the making of prongs or arms 246, 247 which extend radially inwardly from the median portion 240, and the provision of the cutouts 243, 245 results in the making of arms or prongs 248, 249 extending radially outwardly from the median portion 240. The distribution of the lugs or arms 246, 247, 248, 249 (as seen in the circumferential direction of the annular portion 240 as well as radially opposite each other) is such that, when the clutch disc employing reinforcing carriers 215 of the type shown in FIG. 13 is properly assembled, these lugs engage the projections 19a, 19b, 19c of the neighboring sections 8a or 8b. An advantage of a so constructed and assembled clutch disc is that the sections 8a, 8b (and particularly their projections 19a, 19b, 19c) do not (or do not appreciably) penetrate into the material of the neighboring annular portions 14. This, in turn, ensures longer useful life of the friction linings as well as of the resilient cushion and also a more reliable and more predictable operation of the friction linings during the entire useful life of the clutch disc and of the friction clutch which employs the improved clutch disc.

To summarize: The numerous advantages of the improved clutch disc include the ability of the friction linings to conform (or to more accurately conform) to the shapes of the adjacent plates of a friction clutch when the plates undergo positive or negative deformation depending upon whether they are being heated or cooled. Moreover, the useful life of the friction linings is much longer than that of friction linings which are not tiltable relative to each other, and the same holds true for the useful life of the clutch disc which employs such friction linings. Still further, the efficiency, reliability and predictability of operation of the improved clutch disc are superior to such characteristics of conventional friction discs.

An advantage of pairs of reinforcing carriers (such as 15) and of pairs of resilient sections (such as the sections 8a, 8b ) which are of identical design is that the cost of making and assembling clutch discs employing such pairs of identical reinforcing carriers and/or identical sections is much less than the cost of clutch discs which employ differently dimensioned and/or configurated reinforcing carriers and/or sections.

The reinforcing carriers constitute optional but highly desirable and advantageous features of the friction linings. Thus, the carriers enhance the strength of the friction linings, they can be provided with projections which together constitute the fulcrum of the improved clutch disc, and they can serve as a means for reliably securing the annular portions (such as 14) of the friction linings to the sections of the resilient cushion. The reinforcing carriers are normally, or can be, made of a suitable metallic sheet material; however, it is also possible to employ carriers which are made of a suitable plastic material. Two important characteristics of a satisfactory reinforcing carrier are its strength and toughness.

The improved clutch disc and its constituents are susceptible of numerous additional modifications without departing from the spirit of the invention. For example, the features of various types of disclosed friction linings, reinforcing carriers and/or sections of the resilient cushion can be combined and/or utilized interchangeably. Furthermore, savings in numbers of parts and/or assembly time can be achieved by replacing discrete mechanical connectors with welded or otherwise bonded joints. By way of example, the radially inner portions of the sections 8a, 8b can welded to the flange 4 of the clutch disc 1 so that the rivets 10 and the making of holes for such rivets can be dispensed with.

Still further, at least some of the aforementioned ranges (e.g., regarding the relationships of the lengths of certain diameters, the widths of certain parts and/or the widths of various clearances) can be varied upwardly or downwardly, depending on the nature of the friction clutches which employ the improved clutch disc and/or other parameters. For example, the magnitude of the force which the resilient cushion exerts when the clutch is fully engaged and the friction surfaces of the plates of the friction clutch are parallel (or still parallel) to each other can amount to between about 50% and 95% of the bias of the clutch spring upon the axially movable pressure plate. In many instances, the just mentioned range is or can be between 80% and 95% of the bias of the clutch spring in the fully engaged condition of the friction clutch. The remainder of the axial force (i.e., that part which is not taken up by the cushion) is taken up by the fulcrum.

It is also possible to design the sections of the resilient cushion in such a way that their characteristics vary in certain directions, such as radially of the respective clutch disc. For example, and referring again to the section (8a or 8b) of FIG. 7, this section can be designed in such a way that the axial force which can be applied and/or resisted by its radially outer portion can exceed to a desired extent the axial force which can be applied and/or resisted by the radially inner portion. This can be achieved, for example, by designing the section in such a way that the stiffness or spring rate of its radially outer portion exceeds that of the radially inner portion. Furthermore, the stiffness can increase linearly in a direction from the radially inner toward the radially outer part of the section. However, it is equally possible to select the variations of stiffness in such a way that the stiffness increases or decreases in a stepwise fashion or that the stiffness increases or decreases (gradually or stepwise) only in one or more selected portions of a section. For example, the stiffness of the sections forming part of a resilient cushion can be selected in such a way that the radially outer portion of the cushion (e.g., the portion located radially outwardly of the annular center line 32 of the fulcrum 31 shown in FIG. 1) furnishes about two thirds of the total axial force offered by the cushion, and that the remaining third of such force is supplied by the portion of the cushion located radially inwardly of the center line 32.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction discs for use in the friction clutches of power trains in motor vehicles and, therefore, such adaptations should and are intended to be comprehended within the meaning and range of equivalence of the appended claims.

What is claimed is:

1. A clutch disc comprising:

(a) a support rotatable about a predetermined axis, (b) two washer-like annular friction linings coaxial and rotatable with said support, and (c) a resilient cushion disposed between said friction linings;

each of said friction linings comprising at least one annular portion of friction-generating material and at least one reinforcing element carrying the friction-generating material;

the reinforcing element comprising a curved portion extending in a circumferential direction of the clutch disc, the curved portion having a radially outer border zone and a radially inner border zone, and arms projecting radially from at least one of the border zones, the friction generating material defining a radial range in which the material extends, the arms being arranged within the radial range such that the arms do not extend beyond the radial range.

2. The clutch disc of claim 1, wherein the resilient cushion comprises corrugated spring sections with convex and concave corrugations alternating in the circumferential direction of the clutch disc and wherein further the arms are arranged along the circumferential direction so that, in a direction parallel to the axis of the clutch disc, the arms of the reinforcing element are located opposite the convex corrugations of the corrugated spring sections.

* * * * *